United States Patent [19]

Hoshihara et al.

[11] Patent Number: 4,906,540
[45] Date of Patent: Mar. 6, 1990

[54] LEAD-ACID BATTERY HAVING A GRID BASE OF A LEAD-CALCIUM ALLOY AND A LAYER OF LEAD-ANTIMONY-STANNUM ALLOY ROLL-BONDED TO THE GRID BASE

[75] Inventors: Naoto Hoshihara, Shizuoka; Hiroshi Yasuda; Katsuhiro Takahashi, both of Toyohashi, all of Japan

[73] Assignee: Matsushita Electric Industrial Co., Ltd., Osaka, Japan

[21] Appl. No.: 366,534

[22] Filed: Jun. 15, 1989

[51] Int. Cl.$^4$ .............................................. H01M 4/74
[52] U.S. Cl. ..................................... 429/242; 429/245
[58] Field of Search ................ 429/245, 242; 420/570, 420/571, 572

[56] References Cited

U.S. PATENT DOCUMENTS

| | | | |
|---|---|---|---|
| 3,881,952 | 5/1975 | Wheadon | 429/245 X |
| 4,107,407 | 8/1978 | Koch | 429/245 X |
| 4,272,977 | 7/1981 | Matter | 429/245 |

FOREIGN PATENT DOCUMENTS 2721560  5/1977  Fed. Rep. of Germany .

Primary Examiner—Anthony Skapars
Attorney, Agent, or Firm—Stevens, Davis, Miller & Mosher

[57] ABSTRACT

A paste type lead storage battery having a grid constituted by a grid base formed of a lead-calcium alloy and a layer of lead-antimony-stannum alloy roll-bonded integrally to the grid base on at least one side thereof. Preferably, the grid is formed by expanding a sheet of base material to which the alloy layer is integrally roll-bonded. Portions of the base and the alloy layer that serve as a active material support are both in contact with a paste-like active material, and antimony and stannum coexist in the alloy layer. The charge restoration after standing in a discharged state and the lifetime during cycles of charge and discharge including heavy discharge are thereby improved.

6 Claims, 2 Drawing Sheets

LEAD-ACID BATTERY HAVING A GRID BASE OF A LEAD-CALCIUM ALLOY AND A LAYER OF LEAD-ANTIMONY-STANNUM ALLOY ROLL-BONDED TO THE GRID BASE

BACKGROUND OF THE INVENTION

This invention relates to a paste type lead storage battery and, more particularly, to an improvement in properties of grids of a paste type lead storage battery.

Generally, grids of conventional paste type lead storage batteries are formed by casting from a lead(Pb)-antimony(Sb) alloy. A lead(Pb)-calcium(Ca) alloy having improved properties was developed to eliminate the problem of the conventional alloy relating to promotion of self discharge. Also, a method of using an expanded metal grid formed from a rolled sheet was developed apart from the casting method.

While batteries designed to be maintenance-free by adopting Pb-Ca alloy expanded metal grids have been diffused, the properties of such grids have been improved in order to reduce some drawbacks. To improve, for example, the characteristics with respect to cycles of charge and discharge including heavy discharge, a means to form a layer of Pb-Sb-arsenic(As) alloy on the surface of a grid so that degree of adhesion between the grid and the active material has been developed. To overcome the problem in that the corrosion resistance of the Pb-Ca alloy is inadequate, the provision of a layer of Pb-Sb alloy formed on the surface of the Pb-Ca alloy has been proposed, as disclosed in German Patent Laid-Open No. 2721560.

Thus, drawbacks in using the Pb-Ca alloy generally relate to the interface between the grid and the active material. Therefore means to improve this interface or methods of changing properties thereof have been studied.

The present invention is therefore intended to improve the cycle characteristics of a maintenance-free lead storage battery having Pb-Ca alloy grids with respect to heavy-load discharge and recovery after standing in a discharged state.

Because electronization of vehicles is recently being promoted, the load on the power source battery becomes larger and chances of heavy-load discharge also become increased. The period of time in which the battery is left in a discharged state, as well as the frequency of standing in such a state, is thereby increased. It is therefore important to assure the desired performance of starting after standing in a discharged state.

In the case of an agricultural machine, the battery is periodically used in such a manner that it is left for a long period of time after being used, because the term of operation of the machine is limited. When the battery is used again after being left in a discharged state, it is possible that the battery cannot be changed smoothly. To cope with this problem, a layer having a large content of Sn may be formed on the surface of the grid. However, during repetition of standing in a discharged state, restoration of the desired performance becomes difficult. In particular, a reduction in high- rate-discharge performance after standing is considerable.

SUMMARY OF THE INVENTION

It is therefore an object of the present invention to improve charge receiving properties of the battery and, in particular, to limit the reduction in the high-rate-discharge characteristics as well as to improve the cycle characteristics with respect to heavy-load discharge.

In accordance with the present invention, a grid or, more preferably, a positive grid has a grid base formed of lead-calcium alloy and a layer of a lead-antimony-stannum alloy formed on the surface of the grid base. More specifically, the positive grid is formed by expanding a rolled sheet formed by roll-bonding a lead-antimony-stannum alloy foil to a lead-calcium alloy sheet.

If the content of calcium in the lead-calcium alloy sheet formed as the base is less than 0.03% by weight, the mechanical strength of the sheet is small and the sheet is therefore difficult to work. If the calcium content exceeds 1.2% by weight, the corrosion resistance becomes considerably low. It is therefore preferable to set the content of calcium to 0.03 to 1.2% by weight. In the case where the base sheet alloy is a three-component lead-calcium-stannum alloy, substantially the same effects can be obtained by setting the stannum content to 0.1 to 1.0% by weight.

Preferably, the content of antimony in the lead-antimony-stannum alloy formed on the surface of the grid may be 0.2 to 10% by weight. If it is less than 0.2% by weight, the effects of the present invention are inadequate. However, if the antimony content exceeds 10% by weight, the roll-bonding of the alloy foil to the grid base becomes difficult and, at the same time, the rate at which the liquid is reduced during the use of the battery becomes considerably high, resulting in failure to establish ordinary properties of the maintenance-free type. If the content of stannum is equal to or higher than 1.0% by weight, the charging performance after standing in an over-discharged state can be restored smoothly. It is not specifically necessary to limit the upper bound of the stannum content. However, if the stannum content exceeds 10% by weight, the strength of the alloy foil becomes so large that roll-bonding of the alloy foil to the grid base surface is difficult. In addition, the price of stannum is at least 20 times higher than lead. In consideration of these points, it is preferable to set the stannum content within a range of 1.0 to 10% by weight.

The grid of the present invention has effects of improving the charge receiving properties as well as limiting the reduction in the high rate discharge performance during charging after standing. The mechanism relating to these effects cannot be explained definitely. However, it seems that the lead-calcium alloy grid has an essential influence on the phenomina which generate at the interface between the grid and the active material.

A battery having lead-calcium alloy grids becomes difficult to charge once it is left in an over-discharged state for a long period of time. It is possible to relieve this drawback by increasing the stannum content. That is, a passive state layer is formed at the interface between the grid and the active material during standing in an over-discharged state, so that the battery cannot be charged by a charging current. If stannum exists, the formation of such a passive state layer is obstructed and charging is thereby facilitated. However, if the battery is left in a discharged state after the charge/discharge cycle has been repeated so that the degree of adhesion between the grid and the active material becomes reduced, the reduction in the adhesion between the grid and the active material is rapidly promoted and the discharge capacity thereafter decreases considerably, although the charging performance is improved by virtue of stannum. The life of the battery thereby ends sooner.

It was found that, if a layer of lead-antimony-stannum alloy was formed integrally on the surface of the grid base by roll bonding as in the case of the present invention, the capacity of the battery could be sufficiently maintained even during standing in a discharged state after repetition of the charge/discharge cycle. It is thought that a high capacity can be maintained by restoration charging after standing in the discharged state because the extent of corrosion of the alloy layer containing both antimony and stannum during oxidation corrosion of the grid caused by repeated charge and discharge operations is smaller than that of the lead-calcium alloy that forms the base, because the corroded portion of the former is porous and a sufficient degree of adhesion to the active material can be maintained, and because stannum or stannum oxide in the oxidation-corroded layer provides a certain degree of electric conductivity.

The inventors of the present invention had already found, as a means for improving the lifetime during cycles of charge and discharge including heavy discharge, a method of forming a layer of a material having a large content of antimony on the grid surface. However, it was not possible to maintain high-efficiency discharge characteristics by the effect of antimony alone in a case where standing in a discharged state was repeated. It is assumed that while the adhesion between the grid and the active material can be improved by adding antimony, it is not possible to prevent any reduction in the performance only by improving the adhesion if a condition of standing in a discharged state is added. Specifically, it was found that coexistence of antimony and stannum in a layer of lead-antimony-stannum alloy formed on the surface of the grid was effective, while no effect was observed in the case where a lead-antimony layer and a lead-stannum layer were formed separately.

Thus, the present invention is not simply based on the combination of antimony and stannum; it is based on coexistence of these substances and on integrally roll-bonding the layer containing these substances to the base. The performance of the battery is thought to be greatly improved by this synergetic effect.

Reasons for this effect will be assumed below though not made definite.

In accordance with the present invention, a lead-antimony-stannum alloy sheet which has a stannum content higher than that of a lead-calcium alloy forming the base and which contains antimony is roll-bonded to the base on at least one side thereof. The crystal structures of the base and the lead-antimony stannum laYer are made finer by the rolling such as to increase the corrosion resistance, thereby improving physical and mechanical properties at the contact between the base and the surface alloy layer. The surfaces of the base and the surface alloy layer in contact with each other, i.e., part of active material support portions of the grid surrounded by a paste-like active material are not easily made passive because the alloy layer has a large stannum content, thereby enaling the paste-like active material to be retained for a long period of time.

The stannum content of the active material support portion of the base in direct contact with the paste-like active material is small. Therefore, the adhesion of this portion to the active material cannot suitably be maintained, and corrosion of the base at the interface with the paste-like active material proceeds. However, the degree of adhesion between the grid and the paste-like active material is high because the surface alloy layer and the paste-like active material suitably adhere to each other, and the integrally connected state of the surface alloy layer and the grid base press-bonded to each other can be suitably maintained, thereby maintaining the desired performance of the battery during the lifetime.

DESCRIPTION OF THE PREFERRED EMBODIMENTS

Embodiments of the present invention will be described below.

Embodiments of the present invention will be described below.

Figure 1:
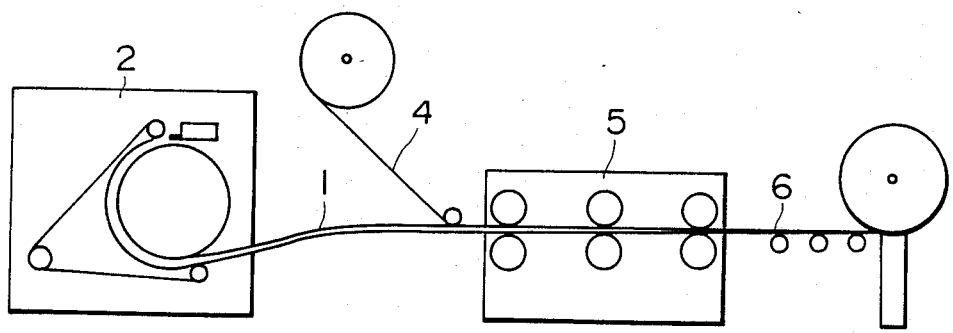
FIG. 1 is a diagram of a process of roll-bonding a lead-antimony-stannum alloy sheet integrally to a lead alloy base in accordance with the present invention.

Referring to FIG. 1, a base 1 was continuously formed from a lead-calcium-stannum alloy by a base casting machine 2 so as to have a strip-like shape.

It is preferable to use as the base 1 a member having a thickness of 14 mm and a width of 80 mm and having a composition in which 0.03 to 1.2% by weight of calcium and 0.1 to 1.0% of stannum are contained. More specifically, a material having a composition consisting of 0.075% by weight of calcium, 0.25% by weight of stannum and the balance substantially lead was used to form the base 1.

The temperature of the sheet of case material 1 at the outlet of the base casting machine was about 180° C. which was lower than the recrystallization temperature of this alloy.

Figure 2:
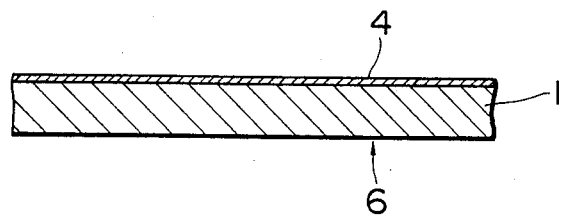
FIG. 2 is a cross-sectional view of a laminated sheet fully rolled after integrally press-bonded.

Each of pairs of sheets of a lead-antimonystannum alloy 4 having thicknesses of 1.2 mm, 1.0 mm, 0.7 mm, 0.5 mm, 0.3 mm, and 0.1 mm, having a width of 20 mm and containing 5% by weight of antimony and 5% by weight of stannum were superposed on a sheet of base material 1 in such a manner that they extended parallel while being spaced apart from each other by 20 mm. Thereafter, these sheets were rolled by a continuous tandem plate mill 5 having at least three mill roll stages, thereby forming a rolled lead alloy sheet 6 having a width of 80 mm, as illustrated in FIG. 2. In the surface of the rolled sheet, a thin lead-antimony-stannum alloy layer was roll-bonded to the lead-calcium-stannum alloy layer. The final thicknesses of the rolled sheets were 2.5, 2.25, 2.0, 1.75, 1.5, 1.25, 1.0, and 0.7 mm.

The lead alloy sheets thereby obtained were bent u faced so that their lead-antimony-stannum alloy surfaces outward. The state of separation of these sheets thereby caused were examined. Results of this test are shown in Table 1. The lead-antimony-stannum alloy sheet was not separated and good properties of the finished lead alloy sheet were obtained so long as the thickness of the lead-antimony sheet was equal to or smaller than 0.7 mm and the reduction ratio was not less than 5.

TABLE 1

| Thickness of resulting sheet | Reduction rate | Thickness of lead-antimony-stannum layer | | | | | |
|---|---|---|---|---|---|---|---|
| | | 0.1 mm | 0.3 mm | 0.5 mm | 0.7 mm | 1.0 mm | 1.2 mm |
| 0.7 mm | 14.4 | o | o | o | o | o | o |
| 1.0 mm | 10 | o | o | o | o | o | o |
| 1.25 mm | 8 | o | o | o | o | Δ | x |
| 1.5 mm | 6.7 | o | o | o | o | x | x |
| 1.75 mm | 5.7 | o | o | o | o | x | x |
| 2.0 mm | 5 | o | o | o | o | x | x |
| 2.25 mm | 4.44 | o | o | o | Δ | x | x |
| 2.5 mm | 4 | o | o | x | x | x | x |

Bonding strength o . . . good,
Δ . . . tolerably good,
x . . . inferior

The minimum of the ratio of the thickness of the thin lead-antimony-stannum alloy layer integrally bonded to the lead alloy base to the thickness of the base was 1/140. However, as a result of the study made by the inventors, the lead-antimony-stannum alloy was suitably roll-bonded integrally to the base when the ratio of the thickness of the thin lead-antimony-stannum layer to that of the base was within the range of 1/20 to 1/200.

Figure 3:
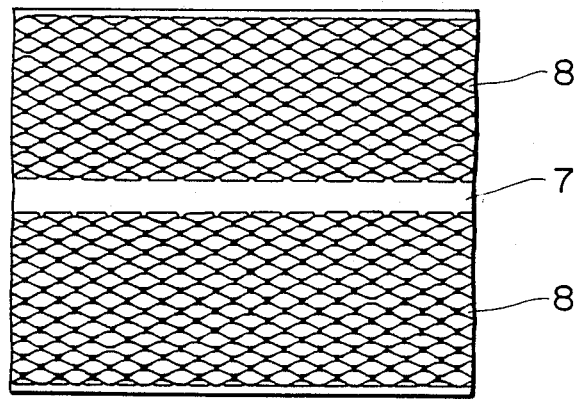
FIG. 3 is a plan view of the rolled laminated sheet after being expanded.
Figure 4:
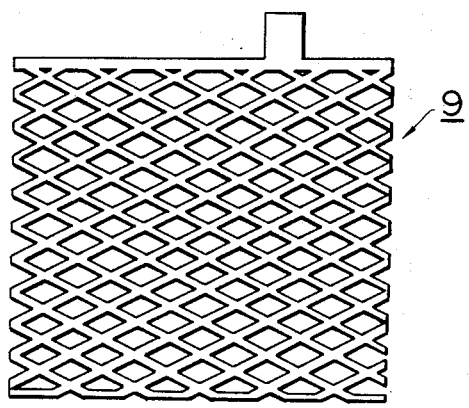
FIG. 4 is a diagram of grid formed of the expanded sheet cut by predetermined dimensions.
Figure 5:
FIG. 5 is a cross-sectional view of an active material support portion.

Each of the thus-formed sheets was expanded in an ordinary manner so that its portions on opposite sides of a non-expanded central portion 7 are expanded so as to have diamond-shaped meshes 8, as shown in FIG. 3. The expanded sheet was further worked by cutting so as to have the desired dimensions and the desired shape, thereby obtaining a grid member 9 such as that shown in FIG. 4. A cross section of an active material support portion of this grid was as illustrated in the enlarged diagram of FIG. 5. That is, the thin lead-antimony-stannum alloy layer 4 was roll-bonded to a surface of the lead-calciumstannum alloy layer 1. The lead-antimony-stannum layer 4 was inclined by twisting during the expansion working so that it generally faced the inside of each mesh. The thus-formed expanded metal grids were used as positive elements, and the elements were packed with a paste-like active material, thus constructing different lots of automotive batteries A. An ordinary battery B for comparison was also manufactured without performing roll-bonding of any lead-antimony-stannum alloy sheet Other manufacturing conditions were the same. Each of the batteries A and B was of the 12 V type.

The batteries A and B were operated in such a manner that each battery was discharged by 5 A until the voltage between the battery terminals decreased to 10.5 V, was thereafter left for 10 days, was then charged at 15 V for 5 hours and was discharged heavily by 300 A at a temperature of minus 15° C. until the terminal voltage decreased to 6.0 V.

The end of the lifetime was determined at a point of time when the period of duration time in which 300 A discharge continued became smaller than 30 seconds.

Figure 6:
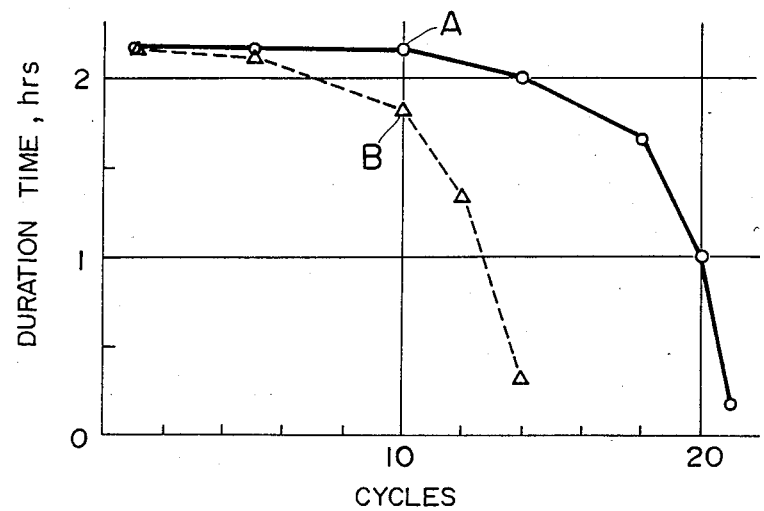
FIG. 6 is a diagram of the lifetime of a lead storage battery assembled with the grid shown in FIG. 5.

FIG. 6 shows results of this test. As apparent from FIG. 6, the battery A of the present invention exhibits an improved lifetime characteristic.

In the above-described embodiment, a cladding of the lead-antimony-stannum alloy sheet 4 was provided by cold rolling on only one side of the stannum-calcium alloy base. However, it is of course possible to clad lead-antimony-stannum alloy sheets or foil on both surfaces of the base sheet.

The grid member is thus formed by expanding the above-described sheet member formed by cold-rolling a lead-antimony stannum alloy sheet and a lead-calcium-stannum alloy base to integrally bond these sheets together, thereby enabling utilization of small-discharge characteristics and, hence, maintenance-free properties of the alloy base as well as limiting, by the effect of stannum, formation of a high-resistance passive state layer at the interface between the grid and the packed paste-like active material while maintaining superior corrosion resistance by adding antimony. To enable these effects, it is sufficient to increase the density (content) of stannum at the grid surface portion above a level of 1.0% by weight, as mentioned above. However, the stannum content in the lead-antimony-stannum alloy sheet or foil should be limited within a range of 1.0 to 10% by weight. This is because, as the stannum content increases, the cost of the sheet or foil becomes increased and, at the same time, the strength thereof becomes larger and the degree of adhesion with the base material at the time of cold rolling thereby becomes reduced. This reduction in the adhesion may cause a reduction in the capacity of the resulting storage battery.

During cold rolling, the alloy base can be maintained at 140° to 190° C. which is lower than the recrystallization temperature at which the crystal grains of the base material become large. The thickness of the lead-antimony-stannum alloy to be rolled is set to a value equal to or smaller than 0.7 mm while the extent of rolling is determined such that the thickness of the rolled sheet is equal to or smaller than 1/5 the thickness of the sheet before rolling, thereby increasing the bonding strength.

After rolling, the rolled sheet may be left for a certain period of time so as to effect age hardening of the sheet, thereby increasing the tensile strength of the sheet.

It is preferable in terms of yield of the material to form the grid by expansion working so that the grid has diamond-shaped meshes. Instead, the sheet may be punched to have apertures having a desired shape.

In the described embodiment, a Pb-Sb-Sn foil is roll-bonded to only one of the two surfaces of the base sheet. However, the same effects can also be obtained in a case where the Pb-Sb-Sn foil is roll-bonded to both the two surfaces of the base. In this case, the proportion of the area of the foil surface to the area of the whole surface of the active material support portion is, preferably, 60% or less. The rolled sheet base in the described embodiment is formed of a Pb-Ca-Sn threecomponent alloy. The present invention, however, also enables sufficient effects in a case where the base is formed of a two component alloy, i.e., a Pb-Ca alloy, and the effects of the present invention are not influenced by the content of Sn in the base.

If the alloy foil is constituted by a Pb-Sb or Pb-Sn alloy alone, it is not possible to obtain a sufficient extension of the lifetime with respect to the operational pattern in the described embodiment. In accordance with the present invention, the lifetime of the battery is remarkably extended by the synergetic effect of Sb and Sn contained in the alloy layer.

As described above, the present invention enables extension of the lifetime of a battery having grids formed of a lead-calcium alloy with respect to an operational pattern such that standing after discharge is repeated. The present invention also enables an improvement in heavy discharge characteristics while maintaining suitable maintenance-free properties.

What is claimed is:

1. A paste type lead storage battery comprising a grid base formed of a lead-calcium alloy, and a layer of a lead-antimony-stannum alloy formed on at least one side of said grid base.

2. A paste type lead storage battery according to claim 1, wherein said grid base is formed of a lead-calcium-stannum alloy, said lead-antimony-stannum alloy has a large content of antimony and a content of stannum larger than that of said base, and said layer of said lead-antimony-stannum alloy is rolled bonded to said base.

3. A paste type lead storage battery according to claim 2, wherein said lead-calcium-stannum alloy has a calcium content of 0.03 to 1.2% by weight and a stannum content of 0.1 to 1.0% by weight, and said lead-antimony-stannum alloy has an antimony content of 0.2 to 10% by weight and a stannum content of 1.0 to 10% by weight.

4. A paste type lead storage battery comprising a lead battery grid formed by expanding a sheet having a base formed of a lead alloy and a foil layer roll-bonded integrally to at least one of two surfaces of said base;
wherein said lead alloy forming said base is a lead-calcium-stannum alloy having a calcium content of 0.05 to 0.1% by weight, a stannum content of 0.1 to 1.0% by weight and the balance substantially lead; and
wherein said foil layer is formed of a lead-antimony-stannum alloy having an antimony content of 1.0 to 10% by weight, a stannum content of 1.0 to 10% by weight and the balance substantially lead.

5. A paste type lead storage battery according to claim 4, wherein said lead alloy base and said foil layer are in direct contact with a paste-like active material at a portion of said grid on which said active material is supported, and the proportion of the area of the surface of said foil layer at said support portion to the area of the whole surface of the same is 60% or less.

6. A paste type lead storage battery according to claim 4, wherein the thickness of said foil layer roll-bonded integrally to said lead alloy base is 1/20 to 1/200 the thickness of said base.

* * * * *